Patented Sept. 2, 1924.

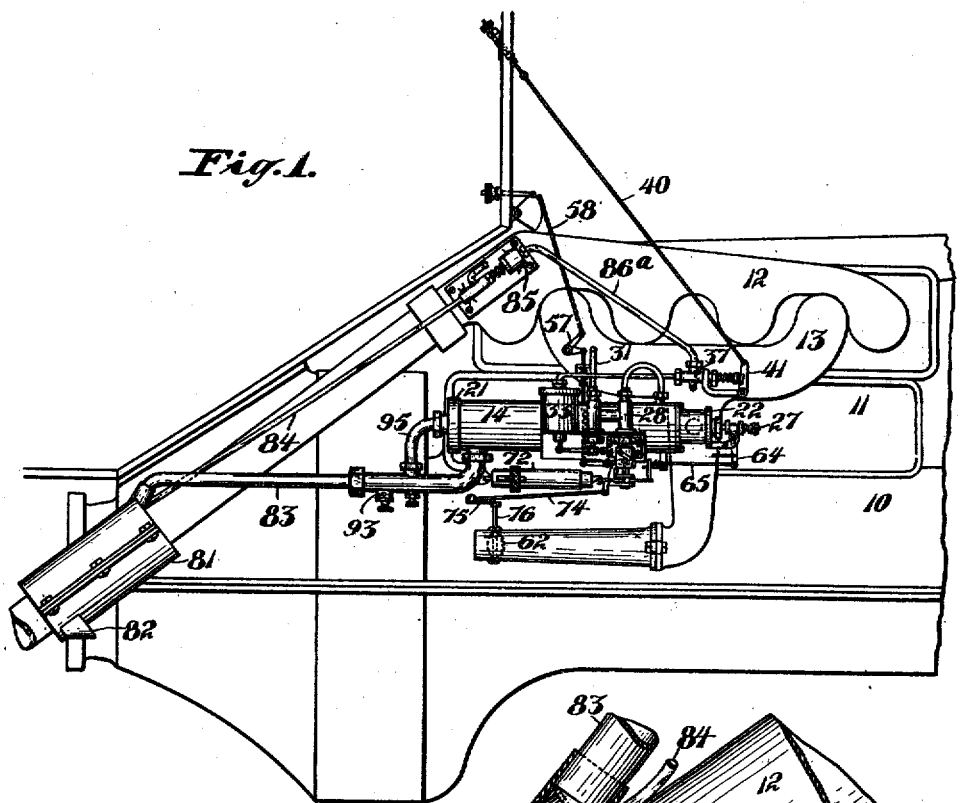

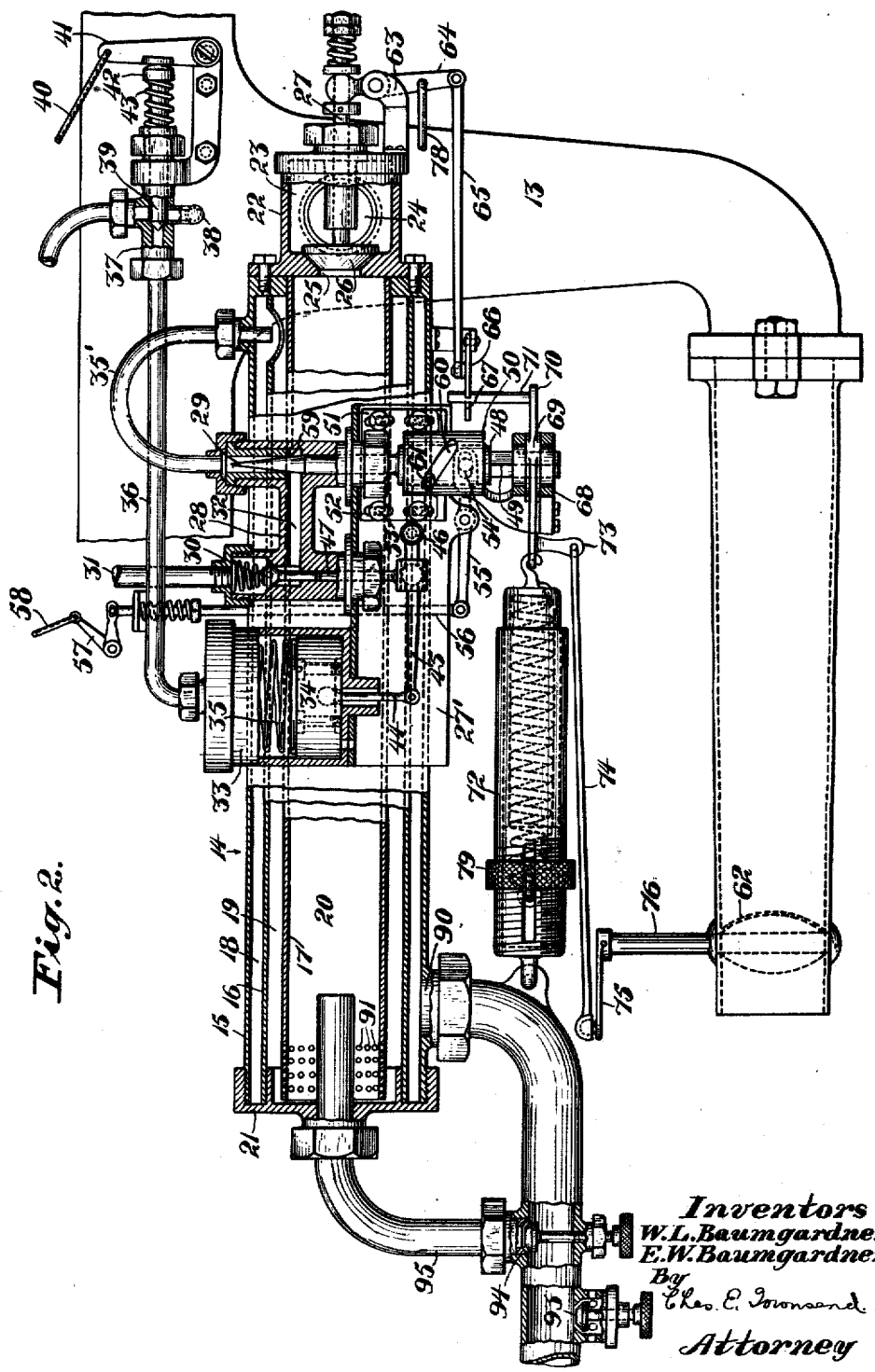

1,507,329

UNITED STATES PATENT OFFICE.

WILLIAM L. BAUMGARDNER AND EARL W. BAUMGARDNER, OF WATSONVILLE, CALIFORNIA.

FUEL VAPORIZER.

Application filed January 4, 1922. Serial No. 526,989.

*To all whom it may concern:*

Be it known that we, WILLIAM L. BAUMGARDNER and EARL W. BAUMGARDNER, citizens of the United States, residing at Watsonville, in the county of Santa Cruz and State of California, have invented new and useful Improvements in Fuel Vaporizers, of which the following is a specification.

This invention relates to fuel vaporizers and particularly pertains to gaseous fuel generating means for internal combustion engines.

Liquid fuel at present obtainable for internal combustion engines is of very poor grade and the matter of its carburetion has become very important. It is the principal object of the present invention therefore to provide a generally improved fuel vaporizer for use in connection with internal combustion engines, which vaporizer will supply the engine with a high grade gaseous fuel, thereby increasing the efficiency of the motor and reducing the fuel consumption thereof to a minimum, said fuel embodying the use of a highly heated aqueous vapor, such as steam, as one of its ingredients, the presence of steam in the mixture acting to more thoroughly heat the vaporized liquid fuel and thereby breaking it up, so that in mixing with the air passing through the apparatus it will commingle therewith to form a substantially homogeneous explosive gas.

The invention contemplates the use of an apparatus whereby steam will be generated and delivered to a heated vaporizing chamber there coming in contact with, atomizing and absorbing the liquid fuel; the vapor thus formed being then admitted to the intake manifold of an internal combustion engine, where it mixes with fresh air after which it is delivered to an explosion engine.

One form which our invention may assume is exemplified in the following description and illustrated in the accompanying drawings, in which—

Fig. 1 is a view disclosing our device applied to an internal combustion engine.

Fig. 2 is an enlarged view of the device partially in section and elevation.

Fig. 3 is an enlarged detail of the air heating element.

Fig. 4 is an enlarged detail of the water valve.

Referring more particularly to the drawings, 10 generally indicates an internal combustion motor, the motor having a cylinder block 11, an exhaust manifold 12 and an intake manifold 13. Arranged adjacent the intake manifold and supported in relation thereto is a vaporizing apparatus embodying the present invention.

Referring to Fig. 2 it will be seen that the apparatus has a main casing 14. This casing comprises three concentric tubular members 15, 16 and 17, which are spaced in relation to one another forming annular chambers 18 and 19 and a central vaporizing chamber 20. The tubular members are supported in their proper relative positions at one end by a cap 21, and at the other end by a valve cage 22. This valve cage 22 is provided with a central chamber 23 which communicates with the interior of the intake manifold by a passageway 24 and with the vaporizing chamber 20 by a valve passageway 25; the latter passageway being formed to seat the throttle valve 26; this valve having a stem 27 supported by the cage 22, through which it extends to connect with an operating mechanism hereinafter more fully described.

Mounted adjacent and supported by the casing 14 is a frame 27, which supports an H-shaped valve body 28 within which is mounted a fuel control valve 29 and a fuel check valve 30. The fuel check valve 30 controls the source of fuel supply which is delivered to valve body by the supply pipe 31. In other words it interrupts the channel 32 which connects the supply pipe 31 with the fuel control valve 29. Also supported by the frame 27 is a cylinder 33 which is provided with a plunger 34 and an expansion spring 35; the latter serving to hold the plunger in its lowermost position. The upper end of this cylinder is connected by a tube 36 to a T-shaped fitting 37. The interior of the fitting 37 is in communication with the interior of the manifold by a connection 38 which is controlled by a needle valve 39. The valve 39 is controlled from the dash board of the automobile by a connection 40 which operates a pivoted lever 41 against the end of the valve stem 42. The spring 43 is adapted to normally keep the valve open.

Depending from the bottom of the plunger 34 is a link 44 which pivotally connects to a lever 45. This lever is pivotally connected to the frame 27', as at 46, and engages the lowermost end of the push rod 47. The push rod 47 enters the H-shaped valve body 28 and engages the lower end of the stem of the fuel check valve 30 so that when the motor is on the suction stroke the cylinder 33 will be evacuated. This will cause the plunger 34 to rise, raising the lever 45 through the medium of the link 44 and will raise the push rod 47 and unseat the valve 30, thereby admitting fuel to the channel 32.

As before stated the fuel control valve 29 is mounted in the H-shaped valve body 28 and interrupts the passage of fuel from the channel 32 into the fuel inlet pipe 35'. The valve 29 is provided with an enlarged cylindrical portion 48 and an extending square shank 49; the former being mounted in a bearing 50. The bearing 50 has a rectangular base 51, which is provided with slots 52 in which are mounted screws 53, the latter being secured to the frame 27'. Engaging a pin 54 which extends from and secured to the rear side of the bearing 50 is a fulcrum lever 55. The free end of this fulcrum lever is connected with the dash board of the automobile by a link 56, a bell crank 57 and a connection 58, with the view of providing adjustment of the fuel valve 29 by raising or lowering the bearing member 50 which raises or lowers the valve 29 in relation to the orifice, 59.

The valve 29 proper may be reciprocated by rotating it. For this purpose a cam slot 60 is formed in the baring 50. Engaging this slot and secured to the valve is a pin 61. It is readily seen that upon partial rotation of the valve it will be lowered or raised as the case may be.

It should be stated that the throttle valve 26, the fuel valve 29 and the fresh air inlet valve 62 are operated in unison. This is accomplished in a manner which will now be described. Mounted on the bracket 63 is a lever 64, having one end operatively connected to the throttle valve stem 27 and the other end connected to the link 65. This link in turn connects with a pivotal lever 66 which has a bifurcated or forked end 67. Rotatably mounted in the extension 68 of the bearing 50 is a bell crank lever 69 having one arm 70 supporting a pin 71 which engages the forked end of the lever 66. The other arm of the bell crank 69 extends and connects with a spring barrel 72 and has an angular extension 73 which connects by a link 74 and the crank arm 75 to the valve shaft 76 of the inlet butterfly valve 62. These three valves may be operated in unison from the dashboard to where the connection 78 may be led and connected to a foot pedal or throttle button, not shown in the drawing, as desired. The spring barrel 72 is provided for the purpose of normally retaining the three valves closed. The tension of the spring in the barrel may be regulated by the nut 79. It is understood that the stationary end of the spring barrel may be secured at any desirable point.

Another feature of the present invention is the means provided for heating and moistening the air admitted to the vaporizing chamber. Referring to Fig. 3, 80 indicates the exhaust pipe of the motor which extends from the exhaust manifold 12 and from which heat is obtained. Circumscribing the exhaust pipe is a heating chamber 81 having an air inlet 82 and a discharge pipe 83 leading to the vaporizer. It is intended that the air supplied to the vaporizer be moistened and for this purpose a pipe 84 and a water valve 85 have been provided. The water valve 85 is controlled by the suction stroke of the motor which creates a vacuum in the pipe 86ª and the valve casing 86 and influences the plunger 87 to unseat the valve 85 and allow water to enter the pipe 84 from a supply pipe 88, which may obtain water from any suitable source. This arrangement is also controlled by the valve 39 in the fitting 37 as is the fuel check valve.

The water entering the pipe 84 lowers by gravity into the chamber 81 where it discharges from the pipe 84 and contacts with the hot exhaust pipe 80. This evaporates the water and heats the surrounding air which passes into the vaporizing chamber as steam.

In operation it will be assumed that the motor is running and the three main valves and the valve 39 of the apparatus are open. The main casing 14 and the exhaust pipe 80 will naturally become hot immediately after the motor has started. The casing is heated by steam from the chamber 81 and by the heat radiated from the motor. On the suction stroke of the motor, water vapor will be drawn into the vaporizer 14 from the heating chamber 81. Simultaneous with this, a vacuum will be created in the cylinder 33 and the piston 34 will rise to operate the link mechanism which is connected to the check valve 30 for unseating the same. This will allow the liquid fuel to be drawn through the channel 32 and the fuel inlet pipe and discharge into the vaporizer. The steam will surround the intermediate tubular member 16 and be drawn through the aperture 90 therein simultaneous with the injection of the liquid fuel. The latter will be thoroughly mixed with the steam and will then travel the length of the casing 14 to enter the main chamber 20 through the perforations 91. During the period of travel into the main chamber 20, the liquid fuel is thoroughly atomized or broken up and mixed with the steam, due to mechanical action and the heat of the steam, thus forming a homogeneous mixture, which on the succeeding suction stroke of the motor is drawn into the manifold. Fresh air is also drawn into the manifold through the passage 93. This fresh air mixes with the fuel vapor in the manifold, forming an ideal combustible mixture, which is supplied to the cylinders.

At times it is desirable to allow the raw fuel to be admitted to the vaporizer and allow it to collect in the bottom thereof and rise in vapor form due to the heat of the chamber and find its way to the main chamber 20, where it mixes with water vapor admitted through the by-pass valve 94 and the pipe connection 95. By so forming the mixture, the fuel will be admitted to the manifold at a higher temperature.

As before described various adjustments of the various valves are obtainable, which at all times enable the operator of the car to obtain a mixture as rich as desired.

A further advantage of the present invention is that the valve 39 may be closed while the engine is running. By closing this valve, the entire fuel supply is cut off from the vaporizer, thus allowing only fresh air into the cylinders so that the car may coast under compression. This not only provides breaking power to the car, but prevents carbonization in the cylinders.

From the foregoing it is obvious that an apparatus has been provided that is very efficient in nature and which is adapted to supply a perfect combustible mixture to the motor, thereby increasing the efficiency and reducing the fuel consumption thereof to a minimum; the apparatus also having the controlling and adjusting mechanism connected with the dashboard of the car so that the driver may expeditiously adjust the apparatus to obtain a mixture of any desired density. Further, the apparatus automatically adapts itself to supply the correct amount of fuel to the engine under any load or condition, thus preventing too rich a mixture under light loads which will overheat the motor and cause an unnecessary large fuel consumption.

While we have shown the preferred form of our invention, as now known to us, we wish it understood that various changes in the construction, combination and arrangement of parts may be made by those skilled in the art without departing from the spirit of the invention as claimed.

Having thus described our invention, what we claim and desire to secure by Letters Patent is—

1. A vaporizer for an internal combustion motor comprising a main casing formed of three concentric tubular members of different diameters and connected at their ends to form an outer annular chamber, an intermediate annular chamber and a central vaporizing chamber, means for introducing steam to the outer chamber at one end of the casing, a passageway formed between the outer and intermediate chamber at the opposite end of the casing, means for injecting liquid fuel into said chambers at said passageway, means establishing communication between the intermediate chamber and the central chamber at the end of the casing opposite said passageway whereby steam and fuel admitted to the casing will mix in the intermediate chamber and enter the central vaporizing chamber to form an explosive gas, and a valve controlled passageway between said central chamber and the intake manifold of the engine.

2. A vaporizer for an internal combustion motor comprising a main casing formed of three concentric tubular members of different diameters and connected at their ends to form an outer annular chamber, an intermediate annular chamber and a central vaporizing chamber, means for introducing steam to the outer chamber at one end of the casing, a passageway formed between the outer and intermediate chamber at the opposite end of the casing, means for injecting liquid fuel into said chambers at said passageway, means establishing communication between the intermediate chamber and the central chamber at the end of the casing opposite said passageway whereby steam and fuel admitted to the casing will mix in the intermediate chamber and enter the central vaporizing chamber to form an explosive gas, a valve controlled passageway between said central chamber and the intake manifold of the engine, and means controlled by the suction of the motor for regulating the amount of liquid fuel delivered to the chamber.

3. A vaporizer for an internal combustion motor comprising a main casing formed of three concentric tubular members of different diameters and connected at their ends to form an outer annular chamber, an intermediate annular chamber and a central vaporizing chamber, means for introducing steam to the outer chamber at one end of the casing, a passageway formed between the outer and intermediate chamber at the opposite end of the casing, means for injecting liquid fuel into said chambers at said passageway, means establishing communication between the intermediate chamber and the central chamber at the end of the casing opposite said passageway whereby steam and fuel admitted to the casing will mix in the intermediate chamber and enter the central vaporizing chamber to form an explosive gas, a valve controlled passageway between said central chamber and the intake manifold of the engine, means controlled by the suction of the motor for regulating the amount of liquid fuel delivered to the chamber, said last named means comprising a cylinder in communication with the intake manifold of the engine, a spring pressed plunger in said cylinder adapted to be operated by suction of the engine, a valve body, a fuel supply pipe connected to said valve body, a fuel inlet pipe connecting said valve body with the main casing, a fuel check valve in said valve body controlling the admission of fuel from the supply pipe, an operative connection between said plunger and said check valve for operating the latter, and an adjustable control valve in said valve body to regulate the discharge of fuel from the valve body into said inlet.

4. A vaporizer for internal combustion motors comprising a vaporizing chamber, means for admitting steam therein, means for injecting liquid fuel into the vaporizing chamber, means controlled by the suction of the motor for regulating the amount of liquid fuel delivered to the chamber, said last named means comprising a vacuum cylinder in communication with the intake manifold of the motor, a spring pressed plunger in said cylinder adapted to be operated by suction of the motor, a valve body, a fuel supply pipe connected to said valve body, a fuel inlet pipe connecting said valve body with the vaporizing chamber, a check valve in said valve body controlling the admission of fuel from the supply pipe, an operative connection between said plunger and said check valve for operating the latter, and an adjustable control valve in said valve body to regulate the discharge of fuel from the valve body into said inlet pipe.

5. A vaporizer for internal combustion motors comprising a vaporizing chamber, means for admitting steam therein, means for injecting liquid fuel into the vaporizing chamber, means controlled by the suction of the motor for regulating the amount of liquid fuel delivered to the chamber, said last named means comprising a vacuum cylinder in communication with the intake manifold of the motor, a spring pressed plunger in said cylinder adapted to be operated by suction of the motor, a valve body, a fuel supply pipe connected to said valve body, a fuel inlet pipe connecting said valve body with the vaporizing chamber, a check valve in said valve body controlling the admission of fuel from the supply pipe, an operative connection between said plunger and said check valve for operating the latter, an adjustable control valve in said valve body to regulate the discharge of fuel from the valve body into said inlet pipe, and communicating means between said cylinder and the manifold including a pipe, a valve in the pipe, and a control for said valve extending to the dash of the automobile.

6. A vaporizing apparatus for an internal combustion engine comprising a casing having a vaporizing chamber therein, means for generating and admitting steam to the chamber, means controlled by the suction of the motor to regulate and admit liquid fuel to the chamber, said means comprising a vacuum cylinder in communication with the intake manifold of the engine, a plunger in said cylinder operable by suction of the engine, a valve body, a fuel supply pipe connected to said valve body, a fuel inlet pipe connecting said valve body with the vaporizing chamber, a check valve in the valve body controlling the admission of fuel from the supply pipe, an operative connection between said plunger and said check valve operating the latter, an adjustable control valve in said valve body to regulate the discharge of fuel from the valve body into said inlet pipe, a passageway between the vaporizing chamber and the intake manifold of the engine, a throttle valve in said passageway, a fresh air inlet valve in the manifold, and means for simultaneously opening said valves to admit vapor from the chamber and fresh air from atmosphere into the manifold.

7. A vaporizing apparatus for an internal combustion engine comprising a casing having a vaporizing chamber therein, means for generating and admitting steam to the chamber, means controlled by the suction of the motor to regulate and admit liquid fuel to the chamber, said means comprising a vacuum cylinder in communication with the intake manifold of the engine, a plunger in said cylinder operable by suction of the engine, a valve body, a fuel supply pipe connected to said valve body, a fuel inlet pipe connecting said valve body with the vaporizing chamber, a check valve in the valve body controlling the admission of fuel from the supply pipe, an operative connection between said plunger and said check valve operating the latter, an adjustable control valve in said valve body to regulate the discharge of fuel from the valve body into said inlet pipe, a passageway between the vaporizing chamber and the intake manifold of the engine, a throttle valve in said passageway, a fresh air inlet valve in the manifold, and a control means operable from the dash of the automobile for simultaneously operating the throttle valve, the fresh air intake valve and the fuel control valve in the valve body in unison, and means normally tending to maintain said valves closed.

WILLIAM L. BAUMGARDNER.
EARL W. BAUMGARDNER.